(12) United States Patent
Aveni (10) Patent No.: US 7,458,172 B2
(45) Date of Patent: Dec. 2, 2008

(54) IMPACT ATTENUATING DEVICES AND PRODUCTS CONTAINING SUCH DEVICES

(75) Inventor: Michael A. Aveni, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 594 days.

(21) Appl. No.: 10/949,813

(22) Filed: Sep. 27, 2004

(65) Prior Publication Data

US 2006/0064900 A1    Mar. 30, 2006

(51) Int. Cl.
*A43B 13/28* (2006.01)
*A43B 13/18* (2006.01)
*A43B 23/00* (2006.01)

(52) U.S. Cl. ............ 36/27; 36/28; 36/114; 36/37; 36/137; 267/144; 267/145; 267/153; D2/967; D2/946

(58) Field of Classification Search ............ 36/27, 36/28, 35 R, 30 R, 25 R, 37, 69, 88, 92, 114, 36/144, 137, 76 R; 267/144, 145, 153; D2/967, D2/946
See application file for complete search history.

(56) References Cited

U.S. PATENT DOCUMENTS

| | | | |
|---|---|---|---|
| 1,942,312 A | 1/1934 | Tutoky | |
| 2,437,227 A | 3/1948 | Hall | |
| 3,204,913 A * | 9/1965 | Lawrence et al. | ............ 248/570 |
| 4,342,158 A | 8/1982 | McMahon et al. | |
| 4,492,374 A | 1/1985 | Lekhtman et al. | |
| 4,535,553 A | 8/1985 | Derderian et al. | |
| 4,536,974 A | 8/1985 | Cohen | |
| 4,566,678 A | 1/1986 | Anderson | |
| 4,611,412 A | 9/1986 | Cohen | |
| 4,753,021 A | 6/1988 | Cohen | |
| 4,774,774 A | 10/1988 | Allen, Jr. | |
| 4,843,737 A | 7/1989 | Vorderer | |
| 4,901,987 A * | 2/1990 | Greenhill et al. | ............ 267/166 |
| 5,205,798 A | 4/1993 | Lekhtman | |
| 5,224,277 A | 7/1993 | Do | |
| 5,280,890 A | 1/1994 | Wydra | |
| 5,353,526 A | 10/1994 | Foley et al. | |
| 5,409,200 A | 4/1995 | Zingher et al. | |
| 5,461,800 A | 10/1995 | Luthi et al. | |

(Continued)

FOREIGN PATENT DOCUMENTS

DE    20000403 U1    5/2001

(Continued)

OTHER PUBLICATIONS

International Search Report dated Jun. 1, 2006.

*Primary Examiner*—Jila M Mohandesi
(74) *Attorney, Agent, or Firm*—Banner & Witcoff, Ltd.

(57) ABSTRACT

An impact attenuating device includes both concave and convex side walls, e.g., in an interleaved arrangement, optionally at least partially surrounded by a restraining element that may help return the impact attenuating device back to its original orientation after attenuating an impact. Such impact attenuating devices may be included in pieces of footwear and/or other foot-receiving devices. Additionally, such impact attenuating devices or portions thereof may be freely selected and/or interchanged in a piece of footwear or other foot-receiving device, e.g., based on one or more characteristics of an intended user and/or an intended use, so as to allow users to obtain footwear (or other devices) customized and targeted for use under a predetermined set of conditions.

29 Claims, 5 Drawing Sheets

U.S. PATENT DOCUMENTS

| | | | | |
|---|---|---|---|---|
| D376,471 S | | 12/1996 | Kalin et al. | |
| 5,588,165 A | * | 12/1996 | Fromme | 5/247 |
| 5,643,148 A | | 7/1997 | Naville | |
| 5,743,028 A | * | 4/1998 | Lombardino | 36/27 |
| 5,822,886 A | | 10/1998 | Luthi et al. | |
| 5,871,298 A | | 2/1999 | Lekhtman et al. | |
| 5,916,071 A | | 6/1999 | Lee | |
| 6,266,897 B1 | | 7/2001 | Seydel et al. | |
| 6,282,814 B1 | | 9/2001 | Krafsur et al. | |
| D450,437 S | | 11/2001 | Simpson et al. | |
| 6,318,001 B1 | | 11/2001 | Lee | |
| 6,457,261 B1 | | 10/2002 | Crary | |
| 6,516,540 B2 | | 2/2003 | Seydel et al. | |
| 6,530,564 B1 | | 3/2003 | Julien | |
| 6,533,258 B2 | * | 3/2003 | Monson et al. | 267/153 |
| 6,665,957 B2 | | 12/2003 | Levert et al. | |
| 6,669,184 B2 | * | 12/2003 | Cai et al. | 267/162 |
| 6,886,274 B2 | | 5/2005 | Krafsur et al. | |
| 6,994,333 B2 | * | 2/2006 | Lobry et al. | 267/145 |
| 2002/0163114 A1 | | 11/2002 | Lobry et al. | |
| 2004/0128860 A1 | | 7/2004 | Smaldone et al. | |
| 2004/0154191 A1 | * | 8/2004 | Park | 36/28 |

FOREIGN PATENT DOCUMENTS

| | | |
|---|---|---|
| JP | 3-195503 | 8/1991 |
| WO | WO 95/20333 | 8/1995 |

* cited by examiner

IMPACT ATTENUATING DEVICES AND PRODUCTS CONTAINING SUCH DEVICES

FIELD OF THE INVENTION

The invention relates generally to impact attenuating devices. Such devices may be provided in a wide variety of different products, e.g., in footwear products and other foot-receiving devices, such as in the heel and/or toe areas of footwear products. This application generally relates to impact attenuating elements of the type described in concurrently filed U.S. patent application Ser. No. 10/949,812 now U.S. Pat. No. 7,314,125 entitled "Impact Attenuating and Spring Elements and Products Containing Such Elements," naming Patricia Smaldone, Michael Aveni, and Fred Fagergren as inventors. This concurrently filed U.S Patent Application is entirely incorporated herein by reference.

BACKGROUND

Conventional articles of athletic footwear have included two primary elements, namely an upper and a sole member or structure. The upper provides a covering for the foot that securely receives and positions the foot with respect to the sole structure. In addition, the upper may have a configuration that protects the foot and provides ventilation, thereby cooling the foot and removing perspiration. The sole structure generally is secured to a lower portion of the upper and generally is positioned between the foot and the ground. In addition to attenuating ground reaction forces (i.e., imparting cushioning), the sole structure may provide traction and control foot motions, such as pronation. Accordingly, the upper and the sole structure operate cooperatively to provide a comfortable structure that is suited for a variety of ambulatory activities, such as walking and running.

The sole member or structure of athletic footwear generally exhibits a layered configuration that includes a comfort-enhancing insole, a resilient midsole formed from a polymer foam material, and a ground-contacting outsole that provides both abrasion-resistance and traction. The midsole is the primary sole structure element that attenuates ground reaction forces and controls foot motions. Suitable polymer foam materials for the midsole include ethylvinylacetate or polyurethane that compress resiliently under an applied load to attenuate ground reaction forces. Conventional polymer foam materials are resiliently compressible, in part, due to the inclusion of a plurality of open or closed cells that define an inner volume substantially displaced by gas.

As noted above, various impact attenuating elements and systems have been known, including such elements and systems for use in footwear products. Conventionally, the insole, midsole, and/or outsole portions of footwear products may include foam or other materials that attenuate shock and dampen vibrations, e.g., in the heel and/or toe areas of a shoe. In at least some instances, a relatively large volume of foam or other material may be needed to fully or sufficiently attenuate the impact force to which footwear products are subjected and to provide sufficient support and/or comfort. This is particularly true for athletic footwear, which may be subjected to relatively high impact forces, e.g., from running, jumping, twisting, changing directions, participating in athletic field events, and the like. An excessively high volume of impact attenuating material, if necessary to adequately attenuate ground reaction forces and/or provide support, may make the shoe stand too tall vertically, particularly for use as an athletic shoe.

Moreover, even when conventional foam materials provide adequate impact attenuation and comfort properties for use in footwear products, these materials do little or nothing in returning energy back to the footwear user. Rather, foam materials typically recover from compression and return to their original shape relatively slowly and with little or no return or "spring-back". Additionally, if a compression force persists on the foam material, this force may further prevent or slow the material's recovery.

Accordingly, it would be useful to provide effective impact attenuating devices that attenuate impact forces (e.g., ground reaction forces), and optionally provide return or "spring-back" energy, e.g., for use in footwear products and/or other foot-receiving devices. Advantageously, such impact attenuating devices will provide these useful properties without excessively adding to the height of the footwear or other product.

SUMMARY

The following presents a general summary of aspects of the invention in order to provide a basic understanding of at least some of its aspects. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of this invention relate to impact attenuating devices and systems and products in which they are used (such as footwear, other foot-receiving devices, and the like). In at least some examples, impact attenuating devices in accordance with this invention will attenuate a component of an incident impact force from a first direction (e.g., a vertical or compressive force component), which action induces a corresponding displacement of a least a portion of the device in a different direction (e.g., a horizontal displacement). Additionally, the displacement may be used to "load" a restraining or ground reaction force attenuating element (e.g., stretch a band surrounding some element(s) of the impact attenuating device, compress or stretch a spring, etc.), which then quickly returns to its original, unloaded orientation, releasing at least some energy back, in a direction opposite to the original direction of the incident force.

Impact attenuating devices in accordance with at least some example aspects of this invention may include, for example: (a) a first element having: (i) a first base portion, (ii) a second base portion, wherein a space is defined between the first base portion and the second base portion, (iii) a first concave side wall portion extending between the first and second base portions and into the space, and (iv) a second concave side wall portion extending between the first and second base portions and into the space; and (b) a second element at least partially included in the space, wherein the second element includes a first convex side wall portion at least partially extending in the space and a second convex side wall portion at least partially extending in the space.

Impact attenuating devices in accordance with still other example aspects of this invention may include: (a) a first element including a plurality of side walls having a first structural orientation; and (b) a second element including a plurality of side walls having a second structural orientation, wherein at least one side wall of the second element is located between two adjacent side walls of the first element and at least one side wall of the first element is located between two adjacent side walls of the second element. In more specific examples of such impact attenuating elements, one of the first structural orientation or the second structural orientation may be a concave orientation with respect to an internal space defined between the first and second elements and the other structural orientation may be a convex orientation with respect to the internal space. The concave and convex side walls of the first and second elements may be arranged in an interleaved or alternating manner such that each side wall of the first element is immediately adjacent two side walls of the second element and each side wall of the second element is immediately adjacent two side walls of the first element.

Impact attenuating devices of the type described above may be included in pieces of footwear and/or other foot-receiving devices in accordance with additional aspects of this invention.

Additional aspects of the invention relate to methods for including impact attenuating devices in products, such as in pieces of footwear or other foot-receiving devices. Such methods may include, for example: (a) providing an upper member and a sole member for a piece of footwear or other foot-receiving device; (b) selecting at least a portion of an impact attenuating device (e.g., a device having a predetermined stiffness characteristic, a predetermined thickness, etc.) at least in part based on a characteristic of an intended user of the piece of footwear or other foot-receiving device (e.g., user weight, foot width, running/walking speed capabilities, jumping capabilities, stride or gait characteristics, etc.) or a characteristic of an intended use of the piece of footwear or other foot-receiving device (e.g., for a specific sport or training type); and (c) providing at least the portion of the impact attenuating device between the upper member and at least a portion of the sole member of the piece of footwear or other foot-receiving device or engaging (directly or indirectly) at least the portion of the impact attenuating device with the upper member or the sole member for the foot-receiving device. The impact attenuating devices and/or the portions thereof may be of the type described generally above, and one or more of them may be freely removed or replaced in the piece of footwear or other foot-receiving device, for example, at a point of sale location (e.g., depending on characteristics of the intended user or its ultimate intended use) or by the user (e.g., depending on the desired characteristics at a given time, for a given use, etc.).

BRIEF DESCRIPTION OF THE DRAWINGS

A more complete understanding of the present invention and certain advantages thereof may be acquired by referring to the following description in consideration with the accompanying drawings, in which like reference numbers indicate like features, and wherein.

DETAILED DESCRIPTION

In the following description of various example embodiments of the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "side," "front," "rear," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.

To assist the reader, this specification is broken into various subsections, as follows: Terms; General Description of Impact Attenuating Devices and Products Containing Them; Specific Examples of the Invention; and Conclusion.

A. Terms

The following terms are used in this specification, and unless otherwise noted or clear from the context, these terms have the meanings provided below.

"Foot-receiving device" means any device into which a user places at least some portion of his or her foot. In addition to all types of footwear (described below), foot-receiving devices include, but are not limited to: bindings and other devices for securing feet in snow skis, cross country skis, water skis, snowboards, and the like; bindings, clips, or other devices for securing feet in pedals for use with bicycles, exercise equipment, and the like; bindings, clips, or other devices for receiving feet during play of video games or other games; and the like.

"Footwear" means any type of wearing apparel for the feet, and this term includes, but is not limited to: all types of shoes, boots, sneakers, sandals, thongs, flip-flops, mules, scuffs, slippers, sport-specific shoes (such as golf shoes, tennis shoes, baseball cleats, soccer or football cleats, ski boots, etc.), and the like.

B. General Description of Impact Attenuating Devices and Products Containing Them In general, aspects of this invention relate to impact attenuating devices, products and systems in which they are used (such as footwear, other foot-receiving devices, heel cage elements, and the like), and methods for including them in such products and systems. Impact attenuating devices in accordance with at least some example aspects of this invention may include, for example: (a) a first element having: (i) a first base portion, (ii) a second base portion, wherein a space is defined between the first base portion and the second base portion, (iii) a first concave side wall portion extending between the first and second base portions and into the space, and (iv) a second concave side wall portion extending between the first and second base portions and into the space; and (b) a second element at least partially included in the space, wherein the second element includes a first convex side wall portion at least partially extending in the space and a second convex side wall portion at least partially extending in the space.

Another example aspect of this invention relates to impact attenuating devices that may include: (a) a first element including a plurality of side walls having a first structural orientation; and (b) a second element including a plurality of side walls having a second structural orientation, wherein at least one side wall of the second element is located between two adjacent side walls of the first element and at least one side wall of the first element is located between two adjacent side walls of the second element. In more specific examples of such devices, one of the first structural orientation or the second structural orientation may be a concave orientation with respect to an internal space defined between the first and second elements and the other structural orientation may be a convex orientation with respect to the internal space. The concave and convex side walls of the first and second elements may be arranged in an alternating or interleaved manner such that each side wall of the first element is immediately adjacent two side walls of the second element and each side wall of the second element is immediately adjacent two side walls of the first element.

Still additional example aspects of this invention relate to impact attenuating devices that include: (a) a first base area; (b) a second base area; (c) a first plurality of side walls extending between the first base area and the second base area; and (d) a second plurality of side walls extending between the first base area and the second base area, wherein an internal space is defined between the first and second base areas and the first and second plurality of side walls. In at least some such devices, when a compressive force is applied such that the first base area and the second base area move closer to one another, the first plurality of side walls flex in a concave direction with respect to the internal space and the second plurality of side walls flex in a convex direction with respect to the internal space. In at least some examples, the side walls may be pre-curved in the concave or convex directions.

Impact attenuating devices in accordance with at least some examples and aspects of the invention further may include additional features. For example, one or more restraining elements may be provided to prevent the impact attenuating device from deforming excessively, to assist in spring back, and/or to prevent dirt or other foreign materials from getting into the device structure. Such restraining element(s) may be provided at any desired location without departing from the invention. For example, in at least some example impact attenuating devices according to the invention, the restraining element(s) at least partially surround the concave and/or convex side wall portions. In other examples, the restraining element(s) will at least partially enclose or contain the first and/or second elements of the impact attenuating device.

Additionally or alternatively, impact attenuating devices according to at least some examples of the invention may include one or more ground reaction force attenuating elements, e.g., located in the space defined between the various parts of the device. Mounting bases or plates also may be provided and engaged with the first and/or second elements of the impact attenuating device (e.g., with the base portions thereof) to enable easy and secure mounting of one or more impact attenuating devices, e.g., as part of a piece of footwear or foot-receiving device, as an independent integral unit, and/or the like.

Additional aspects of the invention relate to pieces of footwear or other foot-receiving devices that include one or more of the impact attenuating devices or systems described above. Such pieces of footwear or other foot-receiving devices may include, inter alia: (a) an upper member; (b) a sole member engaged directly or indirectly with the upper member; and (c) at least one impact attenuating device, e.g., like those described above, located between the upper member and the sole member and/or engaged (directly or indirectly) with at least a portion of the upper member or the sole member. The impact attenuating device(s) may be located in the heel area of the piece of footwear or other foot-receiving device, in the toe area, and/or in any other desired location without departing from this invention. In some examples, one or more of the impact attenuating devices will remain visible and exposed, even after assembly of the footwear or foot-receiving device is completed and/or while the footwear or foot-receiving device is in use, although all of the impact attenuating devices may be enclosed in the footwear or foot-receiving device structure without departing from the invention.

Still additional aspects of the invention relate to methods for including one or more impact attenuating devices in pieces of footwear or other foot-receiving devices. Such methods may include, for example: (a) providing an upper member and a sole member for a piece of footwear or other foot-receiving device; (b) selecting at least a portion of an impact attenuating device at least in part based on a characteristic of an intended user of the piece of footwear or other foot-receiving device or based on a characteristic of an intended use of the piece of footwear or other foot-receiving device; and (c) providing at least the portion of the impact attenuating device between the upper member and the sole member of the piece of footwear or other foot-receiving device and/or engaging at least the portion of the impact attenuating device (directly or indirectly) with the upper member and/or the sole member. The impact attenuating devices or portions thereof may be of the type described above (and described in more detail below).

As more specific examples, the portion of the impact attenuating device for inclusion in the footwear or other foot-receiving device may be selected based on one or more characteristics of the intended end user, such as: the user's weight, the user's shoe size, the user's foot width, the user's moving speed or anticipated moving speed, the user's gait or stride characteristics (e.g., a pronation or supination tendency, etc.), and the like. Also (or alternatively), different impact attenuating devices or portions thereof may be selected depending on the final desired end use of the footwear or other foot-receiving device. For example, different impact attenuating devices or portions thereof (e.g., having different stiffnesses, reboundability, etc.) may be selected depending on whether the product is intended to be used for walking, running, basketball, soccer, football, baseball, softball, sprinting, track events, field events, children's games, video games, etc.

The impact attenuating devices or portions thereof also may be selected and/or included as part of the footwear or other foot-receiving device structure at any desired location without departing from the invention. For example, the impact attenuating devices or portions thereof may be selected at the assembly factory and the products then may be marketed in a manner targeted to specific end user or end use characteristics (e.g., the sales box or a tag on the product might indicate that the shoe is designed for running or jogging for a user between 165 and 180 lbs.). As another example, shoe retailers or wholesalers may have a supply of impact attenuating devices or portions thereof available to insert into the footwear or other foot-receiving devices at the point of sale location, at a warehouse or another location in the supply chain, at a point of use location, etc., e.g., based on the characteristics of the intended user and/or the intended use. As still another example, users may be allowed to freely select and/or change impact attenuating devices or portions thereof, based on their immediate needs, based on the characteristics they desire in the footwear or other foot-receiving device, based on play conditions, etc. (e.g., by switching one impact attenuating device or portion thereof for another).

Specific examples of the invention are described in more detail below. The reader should understand that these specific examples are set forth merely to illustrate examples of the invention, and they should not be construed as limiting the invention.

C. Specific Examples of the Invention

The various figures in this application illustrate examples of impact attenuating devices useful in systems and methods according to examples of this invention. When the same reference number appears in more than one drawing, that reference number is used consistently in this specification and the drawings to refer to the same or similar parts throughout.

Figure 1A:
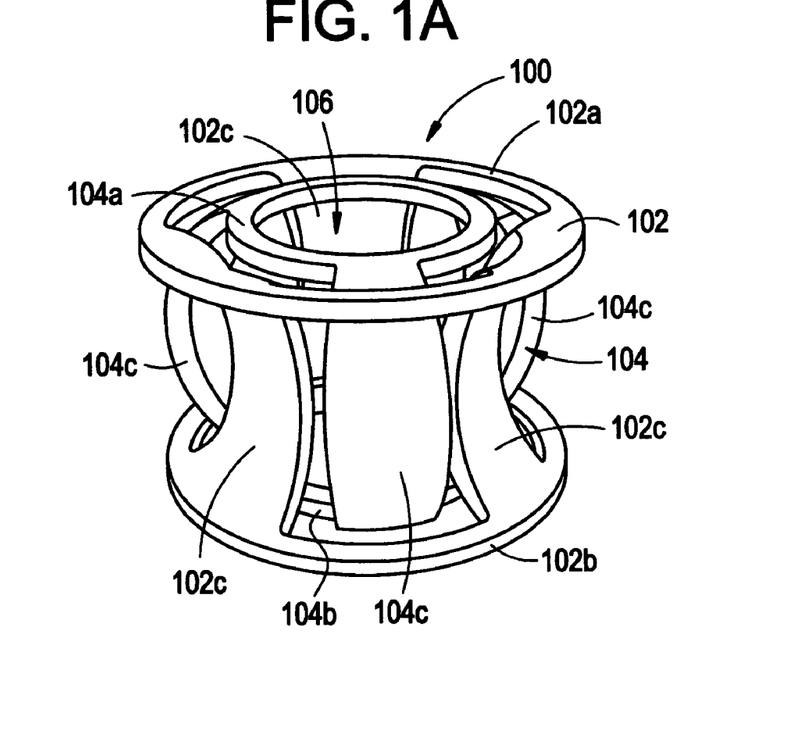
FIGS. 1A through 1C illustrate an example impact attenuating device in accordance with at least some example aspects of the present invention.
Figure 1B:
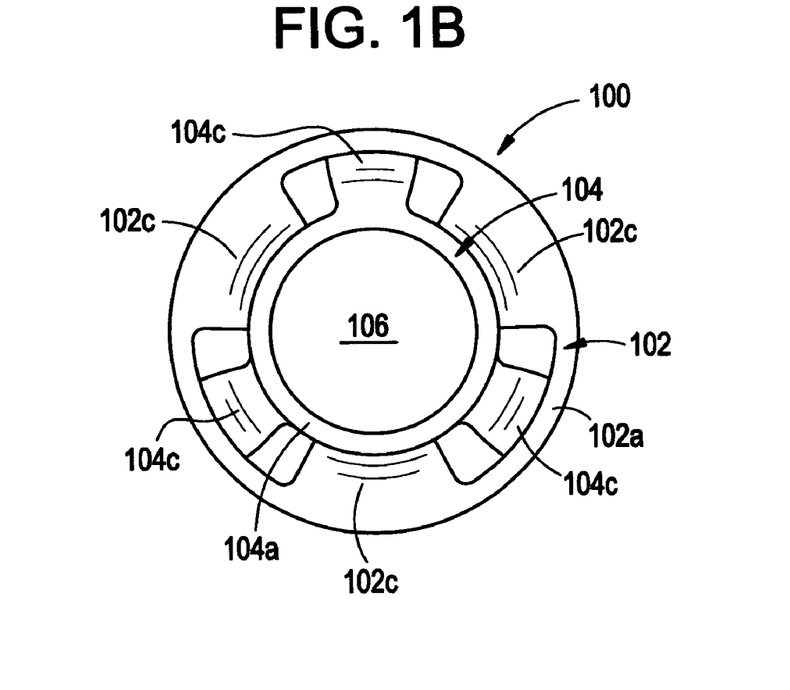
Figure 1C:
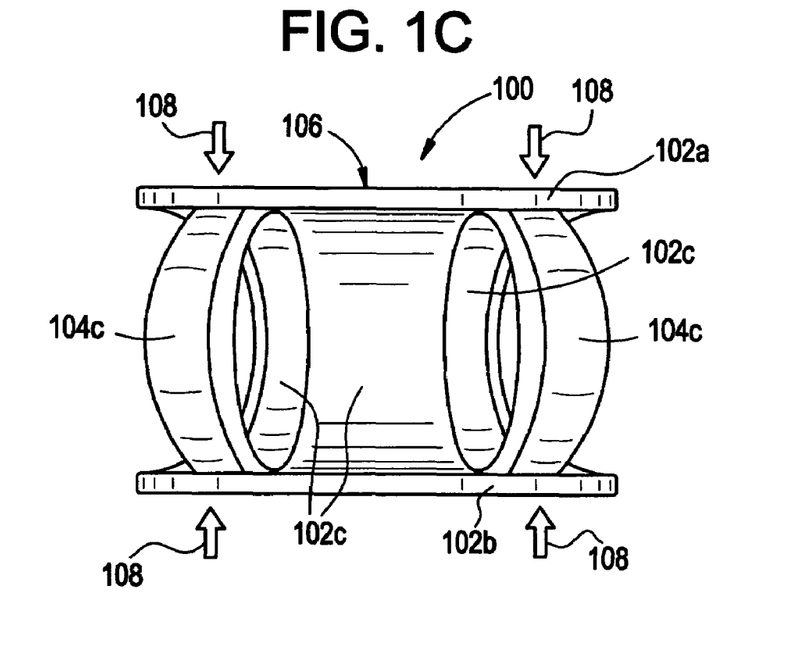

FIGS. 1A through 1C illustrate a first example impact attenuating device 100 in accordance with aspects of the present invention. This example device 100 includes a first impact attenuating element 102 and a second, independent impact attenuating element 104 located at least partially inside the first impact attenuating element 102 (optionally, in a somewhat "nested" orientation). Although these two impact attenuating elements 102 and 104 may directly contact one another, at least some times during use, and/or may even be connected to one another or formed as a single piece, in the illustrated example they are separate, independent elements that contact one another at least some times during use.

The first impact attenuating element 102 includes a first base portion 102a (e.g., a ring located at the top of the first impact attenuating element 102) and a second base portion 102b (e.g., a ring located at the bottom of the first impact attenuating element 102). A plurality of side walls 102c extend between the two base portions 102a and 102b. In a similar manner, the second impact attenuating element 104 also includes a first base portion 104a (e.g., a ring located at the top of the second impact attenuating element 104), a second base portion 104b (e.g., a ring located at the bottom of the second impact attenuating element 104), and a plurality of side walls 104c extending between the two base portions 104a and 104b. The two upper base portions 102a and 104a may form an upper base area, and the lower base portions 102b and 104b may form a lower base area. In this example, an internal space 106 is defined between the various base portions and walls of the two impact attenuating elements 102 and 104. In at least some examples, the impact attenuating element 104 may be flexible enough (optionally, its base portion(s) 104a and/or 104b may be discontinuous) such that it is removable from the internal space 106.

Side walls 102c of this example device 100 extend in a concave manner with respect to the location of the internal space 106 and with respect to the location at which they join their base portions 102a and 102b. In other words, side walls 102c bow inward. Side walls 104c, on the other hand, extend in a convex manner with respect to the location of the internal space 106 and with respect to the location at which they join their base portions 104a and 104b (i.e., they bow outward). In use, a compressive force 108 (e.g., see FIG. 1C) may be applied to one or both of the impact attenuating elements 102 and/or 104 (e.g., by stepping down on the impact attenuating device 100 when in a shoe, landing a jump, etc.). This compressive force 108 is attenuated by flexing concave side walls 102c further inward (toward the internal space 106) and/or by flexing convex side walls 104c further outward (away from the internal space 106).

Many variations in the structure, size, arrangement, and orientation of side walls 102c and/or 104c are possible without departing from the invention. For example, if desired, side walls 102c may extend in a convex manner while side walls 104c may extend in a concave manner, without departing from the invention. As another alternative example, if desired, either or both of impact attenuating elements 102 and 104 may include a combination of concave and convex side walls. As still another potential alternative, either or both of the first and second impact attenuating elements 102 and 104 may include one or more straight or relatively straight side walls that, when a compressive force is applied, will bend in a concave and/or convex manner (optionally such straight or relatively straight walls may be used in combination with one or more convex and/or concave side walls, without departing from the invention). Also, any desired number of side walls may be included in impact attenuating devices according to the invention. Additionally, while the illustrated example shows the side walls 102c and 104c arranged in an alternating, interleaved manner (as one moves around the impact attenuating device structure), any arrangement is possible without departing from aspects of the invention. For example, if desired, impact attenuating element 104 may have two or more side walls 104c located between adjacent side walls 102c of impact attenuating element 102, and vice versa. Combinations of these various wall structures, orientations, and arrangements also may be used without departing from the invention.

The impact attenuating elements 102 and/or 104 may be made of any suitable or desired material without departing from the invention. As one example, the impact attenuating elements 102 and/or 104, or at least the side wall portions 102c and/or 104c thereof, may be made from a material that will flex and/or bend under a compressive force 108 and then return to its original size, shape, and/or orientation (or at least substantially return to its original size, shape, and/or orientation) when the compressive force 108 is removed or relaxed. As further examples, the impact attenuating elements 102 and/or 104, or at least the side wall portions 102c and/or 104c thereof, may be made from a plastic or polymeric material, such as a thermoplastic material, such as DESMOPAN® (a thermoplastic polyurethane material available from Bayer AG of Leverkusen, Germany), PEBAX® (a polyether-block co-polyamide polymer available from Atofina Corp. of Puteaux, France), etc. In at least some examples, impact attenuating elements 102 and/or 104 each may be made as unitary, one-piece members, e.g., by injection molding or by other suitable or desired methods, including conventional methods known in the art.

In at least some example structures according to the invention, the thickness, width, and/or other dimensions of at least some of the side walls 102c and/or 104c of the impact attenuating elements 102 and/or 104, respectively, may be varied. For example, in at least some examples of the invention, the side walls 102c and/or 104c may be thin and/or narrow near the base portions 102a, 102b, 104a, and/or 104b and thicker and/or wider at their central portions. In other words, at least some of the side walls 102c and/or 104c are thicker and/or wider at their center area as compared with their ends. Either or both of the wall thickness and/or its width may change over the length of the wall 102c, in at least some example impact attenuating devices according to the invention. In this manner, the impact attenuating elements 102 and/or 104 may more easily flex as the compressive force 108 is initially applied and/or when a relatively light force is applied, but the force 108 will meet more resistance to flex as it progresses and/or when a stronger force is applied (due to the fact that the thicker and/or wider wall portions will be required to flex at those times). This feature allows the impact attenuating devices 100 to attenuate the compressive force 108, thereby flexing the various concave and/or convex side walls 102c and/or 104c.

Accordingly, the stiffness, spring-back, and other characteristics of the impact attenuating device 100 may be changed or altered (e.g., by the manufacturer, wholesaler, retailer, end user, etc.) by changing one or more impact attenuating elements 102 and/or 104 with elements having different thickness, stiffness or other characteristics.

Many additional variations in the impact attenuating device 100 structure are possible without departing from the invention. For example, in the example structure illustrated in FIGS. 1A through 1C, the base portions 102a and 104a lie on or substantially on a common plane (additionally, base portions 102b and 104b lie on or substantially on a common plane). This is not a requirement. Rather, if desired, the base portion(s) of either impact attenuating element 102 or 104 (or portions thereof) may extend above or below the base portion(s) of the other impact attenuating element. As another example, the base portions 102a, 102b, 104a, and 104b are shown as single piece configurations in FIGS. 1A through 1C (e.g., as unitary rings). This also is not a requirement. Rather, if desired, one or more of the side walls 102c and/or 104c may terminate, at either end, at a base portion such that one or both of the overall base portions 102a, 102b, 104a, and/or 104b are formed from multiple parts (e.g., the base portions may be discontinuous).

Figure 2:
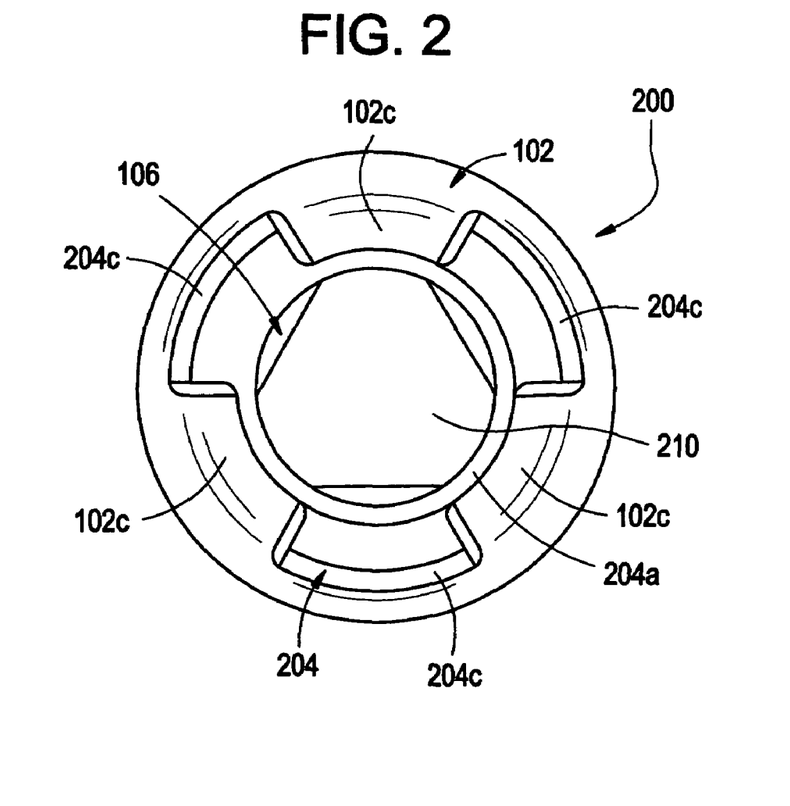
FIG. 2 illustrates an overhead view of another example impact attenuating device including additional features in accordance with at least some example aspects of the present invention.

FIG. 2 illustrates an overhead view of an example alternative impact attenuating device structure 200 according to at least some aspects of the present invention. This impact attenuating device 200 includes a first impact attenuating element 102 having the same or essentially the same structure as the impact attenuating element 102 illustrated in FIGS. 1A through 1C. While the second impact attenuating element 204 has a similar overall structure and appearance as the impact attenuating element 104 illustrated in FIGS. 1A through 1C, there are some noteworthy differences. For example, the side walls 204c of impact attenuating element 204 are considerably wider than side walls 104c of impact attenuating element 104, particularly near the base portions (e.g., 204a). Accordingly, in this example, impact attenuating element 204 would be expected to be somewhat stiffer than impact attenuating element 104 (assuming both were made from the same types of materials and of the same thickness). Therefore, replacing impact attenuating element 104 with impact attenuating element 204 would be expected to result in a stiffer overall impact attenuating device 200. The thickness of impact attenuating element 204 also may be adjusted, if desired, to further alter its stiffness properties (and thus the stiffness or flex resistance properties of the entire impact attenuating device 200).

Additionally, in the example impact attenuating device 200 illustrated in FIG. 2, internal space 106 includes one or more additional ground reaction force attenuating elements 210 provided therein. These ground reaction force attenuating element(s) 210 may take on any suitable or desired form, size, shape, orientation, arrangement, or other characteristics without departing from the invention. For example, the ground reaction force attenuating element 210 may be another flexible plastic or polymeric impact attenuating element of the general type as impact attenuating elements 102 and/or 204 without departing from the invention, e.g., designed with concave or convex side walls to further nest within and/or at least partially fit in the internal space 106. As another example, ground reaction force attenuating element 210 may constitute one or more three dimensional pieces of plastic, foam rubber, and/or other material, such as materials conventionally used in the outsole, midsole, and/or insole of footwear products. If desired, at least some portions of the ground reaction force attenuating element 210 may extend outside the internal space 106 and/or outside the impact attenuating device 200. Other ground reaction force attenuating element structures and arrangements also are possible without departing from the invention.

The ground reaction force attenuating elements 210, in at least some examples of the invention, potentially may perform several functions. First, in at least some examples, the element 210 may attenuate some of the compressive force 108 to which the impact attenuating device 200 is subjected during use, which can help alleviate stress and/or strain on the remaining impact attenuating elements (e.g., elements 102 and/or 104). As another example, if desired, ground reaction force attenuating element 210 may function as a stopper to prevent the remaining impact attenuating elements 102 and/or 204 from excessively compressing under the applied compressive force 108 (which again can help alleviate stress and/or strain on the remaining impact attenuating elements (e.g., elements 102 and/or 104)). As still another example, portions of the ground reaction force attenuating element 210 may exert an outward force on the concave side walls 102c of impact attenuating element 102 (outward with respect to the internal space 106), thereby helping to return the impact attenuating element 102 back to its original orientation (or back to substantially its original orientation). Such spring back action, in at least some instances, can help improve the user's performance by providing a reflexive force to help recover from the exerted compressive force 108. Additionally, the element 210 may help prevent dirt or other debris or foreign material from entering and potentially damaging the impact attenuating device 200 structure. Optionally, in at least some examples, the impact attenuating element 204 and/or the ground reaction force attenuating element 210 may be flexible enough and/or appropriately sized such that one or both are removable from the internal space 106. This may allow for replacement of the impact attenuating element 204 and/or the ground reaction force attenuating element 210 with elements of different characteristics, e.g., for customization purposes as described above.

Figure 3A:
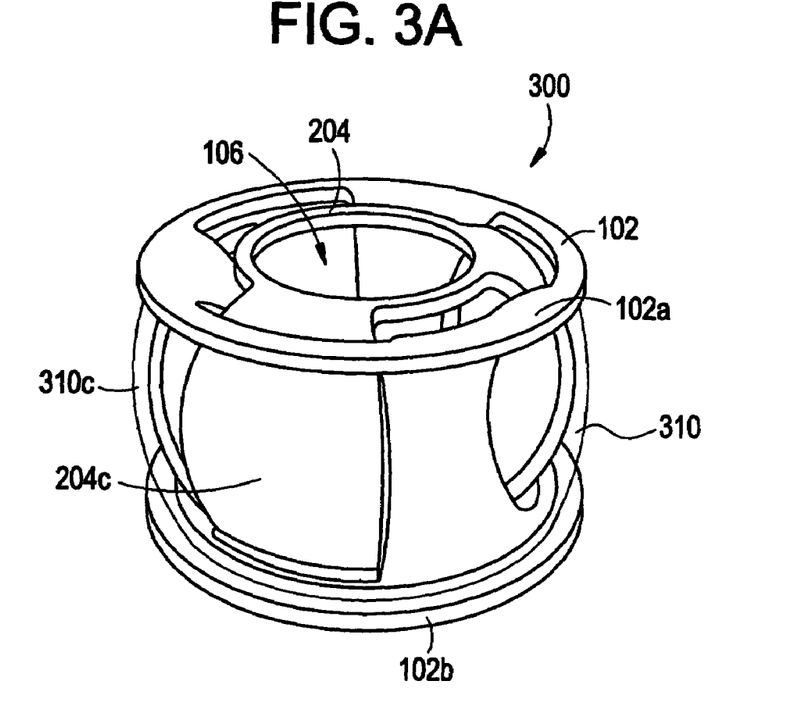
FIGS. 3A and 3B illustrate an example impact attenuating device including additional features in accordance with at least some example aspects of the present invention.
Figure 3B:
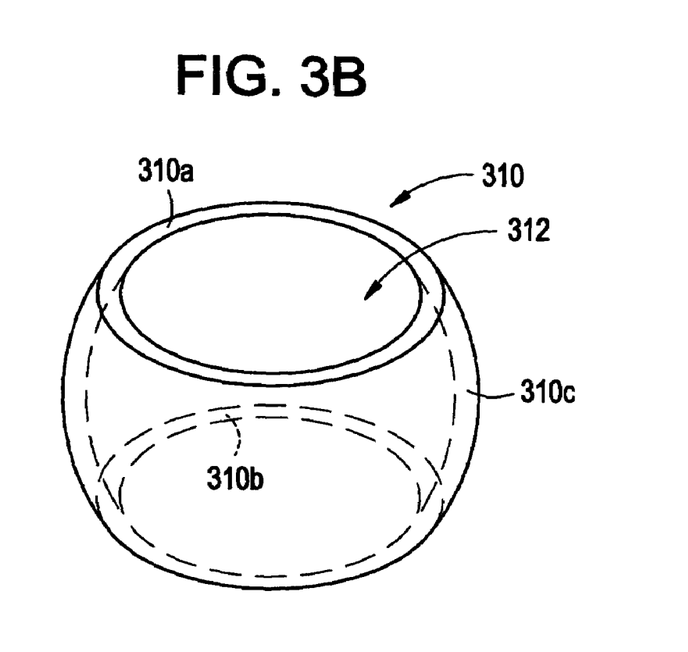

FIGS. 3A and 3B illustrate an impact attenuating device 300 including additional features according to some examples of the invention. This example impact attenuating device 300 includes a first impact attenuating element 102 and a second impact attenuating element 204 the same as or similar to those described above in conjunction with the example of FIG. 2. In this example device 300, a restraining element 310 is provided around the outside of impact attenuating elements 102 and 204. In the illustrated example, the restraining element 310 is cylindrical or ring-shaped and configured such that its upper surface 310a fits underneath base portion 102a of the first impact attenuating element 102 and its lower surface 310b fits above base portion 102b. Additionally, in the illustrated example, the side wall 310c of restraining element 310 is concave shaped (with respect to its internal space 312) such that it fits around at least some portion of the convex side walls 204c of impact attenuating element 204. This restraining element 310 may be made from a flexible polymeric material.

Restraining elements 310, in at least some examples of the invention, potentially may perform several functions. First, in at least some examples, the restraining element 310 may help prevent dirt or other debris or foreign material from entering and potentially damaging the impact attenuating device 300 structure. Additionally, the restraining element 310 may attenuate some of the compressive force 108 to which the impact attenuating device 300 is exposed during use, which can help alleviate stress and/or strain on the remaining impact attenuating elements (e.g., elements 102 and/or 104). As another example, if desired, restraining element 310 may function as a stopper to prevent the remaining impact attenuating elements 102 and 204 from excessively compressing under the applied compressive force (which again can help alleviate stress and/or strain on the remaining impact attenuating elements (e.g., elements 102 and/or 104)). As still another example, portions of the restraining element's side wall 310c may exert an inward force on the convex side walls 204c of impact attenuating element 204 (inward with respect to the internal space 106), thereby helping to return the impact attenuating element 204 to its original orientation (or back to substantially its original orientation). Such spring back action, in at least some instances, can help improve the user's performance by providing a reflexive force to help recover from the exerted compressive force 108.

Of course, the restraining element 310 can take on any size, configuration, arrangement, or orientation without departing from the invention. For example, the restraining element 310 need not completely fill the space between the top base portion 102a and the bottom base portion 102b of impact attenuating element 102. Additionally or alternatively, the restraining element 310 may fit somewhat loosely around the outside of the convex side walls 204c when no compressive force is applied to the device 300 and then stop or help slow the flexure of side walls 204c and/or compression of impact attenuating element 102 when the force is applied. As another alternative, the restraining element 310 may fit rather tightly around the outside of the convex side walls 204c when no compressive force 108 is applied to the device 300 to provide a stiffer overall impact attenuating device 300. Additionally, the restraining element 310 need not completely surround the impact attenuating elements 102 and/or 204 (e.g., gaps, openings, or the like may be provided, the restraining element 310 may be C-shaped, etc., without departing from the invention). As still another potential alternative, the restraining element 310 may be made from more than one individual pieces without departing from the invention (e.g., the restraining element 310 may constitute two or more C-shaped pieces that can clip around one or more side walls 204c, etc.). As still another example, if desired, individual restraining elements may be provided around individual side walls 102c and/or 204c.

Optionally, in at least some examples, the impact attenuating element 204 and/or the restraining element 310 may be flexible enough and/or appropriately sized such that one or both are removable from the impact attenuating element 102. In this manner, one restraining element 310 can be replaced by another, e.g., one having different characteristics, to enable change to the overall stiffness characteristics of device 300 (e.g., for customization purposes). The restraining element(s) 310 may be made from plastic, polymeric, or other desired materials. Also, if desired, in at least some examples, an impact attenuating device 300 may include both ground reaction force attenuating element(s) 210 (e.g., of the type described above) and restraining element(s) 310, without departing from the invention.

Figure 4A:
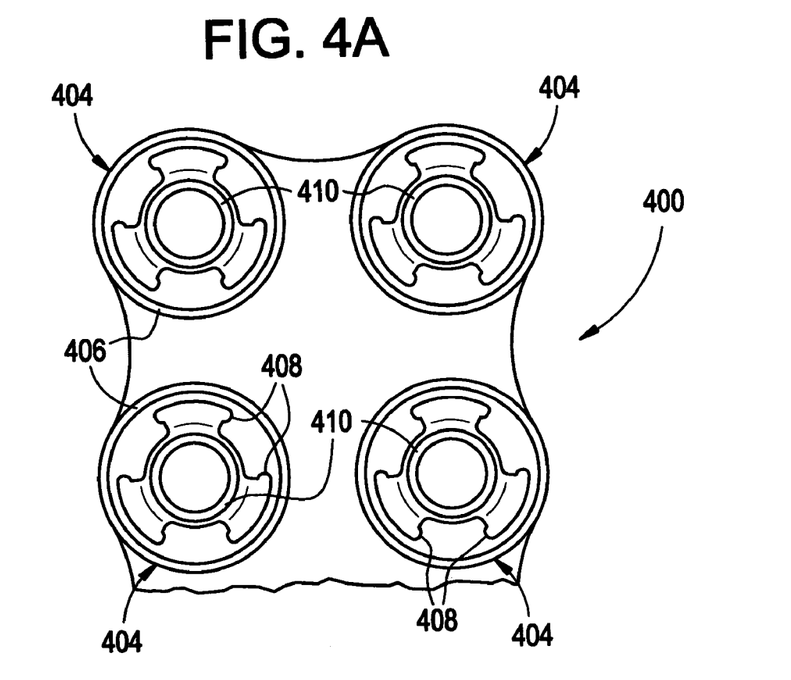
FIGS. 4A and 4B illustrate an example impact attenuating system including additional features in accordance with at least some example aspects of the present invention.
Figure 4B:
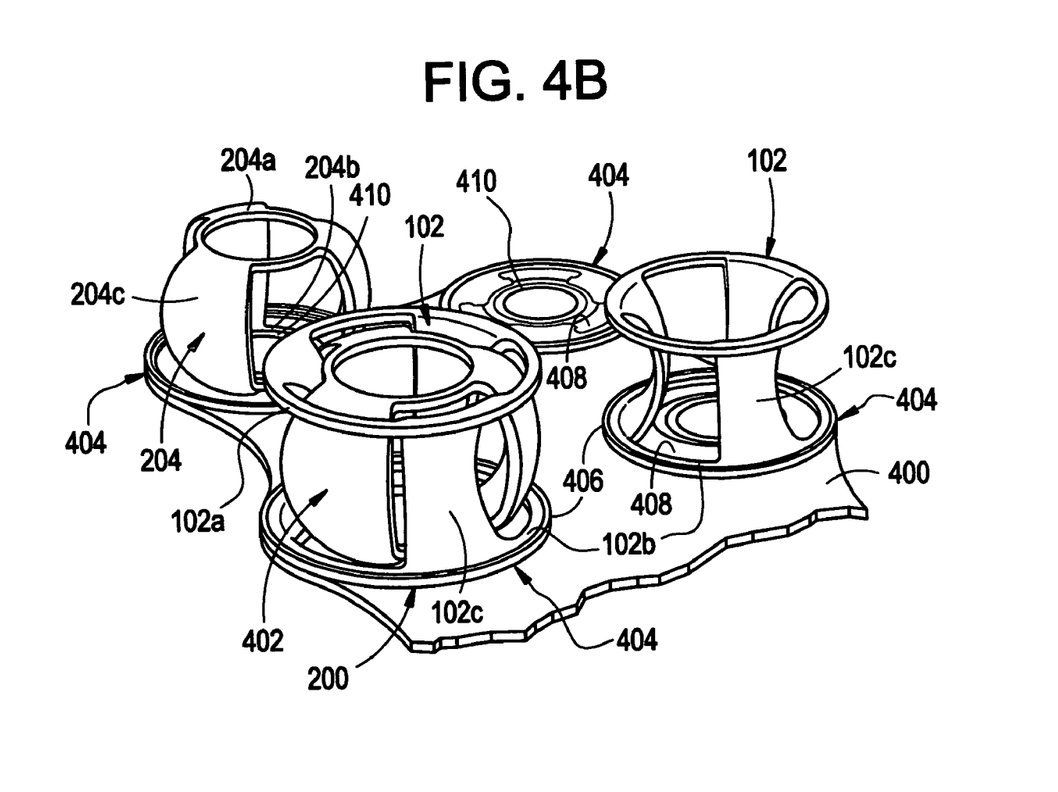

FIGS. 4A and 4B illustrate additional features useful in at least some examples of this invention. For example, these figures illustrate a mounting base 400 onto which one or more impact attenuating devices 402, like those illustrated in FIGS. 1A through 3A, or portions thereof, may be mounted. In the illustrated example, the mounting base 400 includes plural locations 404 capable of receiving an impact attenuating device 402 or some portion thereof. The mounting base 400 may be made of any suitable or desired material, for example, plastic or polymeric material, such as conventional thermoplastic materials known in the art, like those described above.

As another example, the mounting base 400 may form a portion of a device into which the impact attenuating device(s) 402 is (are) to be received, such as a foot-receiving device. Even more specifically, in at least some examples, the mounting base 400, optionally including mounting locations 404, may be included in and/or form a portion of an upper member, a midsole member, an insole member, an outsole member, a heel cage unit, or other portion of a piece of footwear or other foot-receiving device.

In at least some examples, the impact attenuating device mounting locations 404 may include raised projections and/or lowered recesses capable of at least partially receiving, retaining, and/or abutting against a portion of an impact attenuating device 402. For example, mounting locations 404 may include an outer raised ring 406 that engages base portions 102a or 102b of a first impact attenuating element 102. Additionally, mounting locations 404 may include areas with raised outer edges 408 between which the side walls 102c of impact attenuating element 102 fit. These raised outer edges 408 abut the side walls 102c to help keep the impact attenuating element 102 in place on the mounting plate 400. Of course, rather than using raised areas, the mounting locations 404 may include lowered recesses and/or combinations of raised areas and lowered recesses that accommodate and/or abut various portions of the impact attenuating element 102 without departing from the invention.

Additionally, the impact attenuating device mounting locations 404 may include areas for receiving, retaining, abutting, and/or otherwise accommodating impact attenuating element 204. For example, as illustrated, mounting locations 404 may include a raised inner ring 410 around which a base portion 204a or 204b of impact attenuating element 204 may be engaged. The raised edges 408 described above may, at least in part, abut base portion 204a or 204b to prevent it from moving away from the inner ring 410 toward the outer ring 406. Additionally, the mounting locations 404 may include areas with raised outer edges (e.g., between edges 408) between which the side walls 204c of the impact attenuating element 204 may fit. These raised outer edges may abut the side walls 204c to help keep the impact attenuating element 204 in place on the mounting plate 400. Of course, rather than using raised areas, the mounting locations 404 may include lowered recesses and/or combinations of raised areas and lowered recesses that accommodate and/or abut various portions of the impact attenuating element 204 without departing from the invention.

In addition to or as an alternative to the mounting locations 404, the impact attenuating devices 200 or portions thereof may be fixed to a mounting plate 400 or fixed between a pair of mounting plates 400 in any suitable or desired manner without departing from the invention. For example, one or more impact attenuating devices 200 or portions thereof may fixed to the mounting plate(s) 400 by adhesive, cements, welding, mechanical connectors, or the like. As another example, two mounting plates 400 may be connected together in some manner, e.g., using cement, adhesives, mechanical connections, etc., such that a compressive force is applied to the impact attenuating device(s) 200 to hold it (them) in place (optionally, with the aid of the raised projections and/or lowered recesses, cement, adhesives, etc., as described above). A "heel cage," e.g., an impact attenuating unit for fitting into the heel area of a piece of footwear or other foot-receiving device, may be prepared by mounting one or more impact attenuating devices (e.g., devices 200) between two (or more) mounting plates 400, and fixing the entire system together as a unit, e.g., via cement, adhesives, mechanical connections, etc. A heel cage unit of this type still may be designed to allow removal or insertion of one or more impact attenuating devices, e.g., for customization purposes, to change stiffness characteristics, for repair, etc.

Additional structural and/or other modifications are possible without departing from the invention. For example, while the above examples provide at least two separate impact attenuating elements (e.g., one with concave side walls and one with convex side walls), impact attenuating devices in accordance with at least some examples of the invention need not have this two part construction. For example, an impact attenuating device having a single impact attenuating element may be provided, e.g., wherein the impact attenuating element includes both concave and convex side walls, without departing from the invention. As another example, the side walls in the illustrated examples are pre-fabricated in a concave or convex orientation. This also is not a requirement. Rather, if desired, at least some of the side walls of one or more of the impact attenuating elements may be straight or substantially straight (optionally in a slanted orientation with respect to a vertical direction), and the side walls then could flex under the compressive force to a concave or convex orientation. Optionally, if desired, these straight or substantially straight side walls could be constructed, arranged, and/or oriented in the overall impact attenuating device to flex to a predetermined orientation when the compressive force is applied (e.g., some of the side walls may be constructed, arranged, or oriented in such a manner to provide a concave flex while other side walls may be constructed, arranged, or oriented in such a manner to provide a convex flex). Of course, other changes to the specific details of the impact attenuating devices and systems containing them may be made without departing from the invention.

Figure 5:
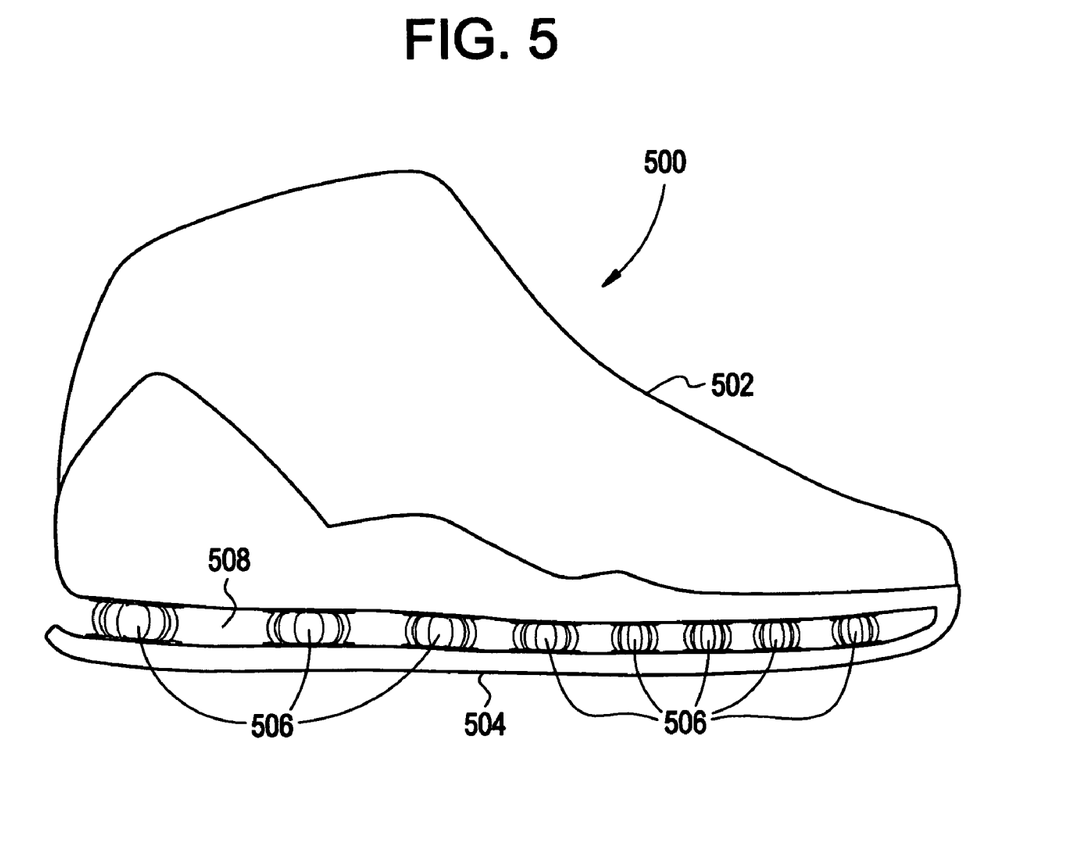
FIG. 5 illustrates an example foot-receiving device including plural impact attenuating devices in accordance with at least some example aspects of the present invention.

As noted above, one or more impact attenuating devices in accordance with at least some aspects of this invention may be used as impact attenuating devices in pieces of footwear or other foot-receiving devices. FIG. 5 generally illustrates an example piece of footwear (or other foot-receiving device) 500 that includes an upper member 502 and an outsole member 504. One or more impact attenuating devices 506 in accordance with aspects of this invention may be included at any suitable or desired location, e.g., between the upper member 502 and the outsole member 504, as part of a midsole or insole structure, as a separate heel cage or toe cage unit inserted between the upper and outsole members, etc. As shown in FIG. 5, the impact attenuating devices 506 may be included in the heel area and/or in the toe area without departing from the invention. Impact attenuating devices 506 of the type described above may be provided in the arch area of a foot-receiving device to provide support for the arch, if desired.

In some examples, the piece of footwear or foot-receiving device 500 may be constructed such that an open area 508 is defined between at least a portion of the upper member 502 and the outsole member 504 (possibly part of a midsole structure in the piece of footwear may include the open area 508), and one or more impact attenuating devices 506 may be included in this open area 508. In at least some examples, the open area 508 will remain open and exposed in the final footwear or foot-receiving device product, e.g., without immediately surrounding foam, midsole structure, or other structural elements, akin to footwear products available from NIKE, Inc. under the trademark SHOX. In other examples, the impact attenuating devices 506 may be hidden (e.g., included in the midsole and/or outsole structure) and not readily visible to the user or retailers in the final footwear or foot-receiving device product without departing from the invention, although, if desired, access openings or windows may be provided.

Of course, the impact attenuating devices 506 may be provided at any desired location in a footwear or other foot-receiving device product without departing from the invention. For example, one or more impact attenuating devices 506 may be included as part of a footwear or foot-receiving device midsole, as part of the outsole, as an independent element, and/or in another part of the shoe without departing from the invention. Additionally or alternatively, one or more impact attenuating devices 506 may be present in an open space (like space 508) while others may be hidden in the same footwear or other foot-receiving device product. Other arrangements also are possible without departing from the invention.

Additional aspects of this invention relate to methods for providing footwear or foot-receiving devices including impact attenuating devices of the type described above. As mentioned above, the stiffness or impact resistant characteristics of impact attenuating devices according to examples of this invention can be easily changed, for example, by selecting structural features of the various elements of the impact attenuating device so as to provide different stiffness or impact attenuating characteristics (e.g., by changing the material of one or more parts of the impact attenuating member, changing the width or thickness of one or more parts of the impact attenuating member, adding ground reaction force attenuating elements, adding restraining elements, changing the materials, dimensions, or other characteristics of impact attenuating, ground reaction force attenuating, and/or restraining elements, etc.).

Various factors may be taken into consideration when determining the specific characteristics of impact attenuating device(s) and/or portions thereof to place in a given piece of footwear or other foot-receiving device. For example, characteristics of the impact attenuating device(s) and/or portions thereof may be selected based on one or more characteristics of the intended end user, such as: the user's weight, the user's shoe size, the user's foot width, the user's moving speed, the user's jumping ability, the user's gait or stride (e.g., a pronation or supination tendency, etc.), and the like. Also, different impact attenuating devices and/or portions thereof may be selected depending on the final desired intended end use of the footwear or other foot-receiving device product. For example, different impact attenuating devices or one or more portions thereof (e.g., having different stiffnesses) may be selected or included in the foot-receiving device product(s) depending on whether the product is used for walking, running, basketball, soccer, football, baseball, softball, sprinting, track events, field events, cross-training, as a video game element, as a training device, etc.

The potential stiffness or impact attenuating characteristic variability features allow manufacturers, retailers, users, or others to selectively determine and/or change the stiffness or impact attenuating characteristics of a piece of footwear or other foot-receiving device by selecting different impact attenuating devices and/or portions thereof (such as the individual impact attenuating elements, the optional ground reaction force attenuating or restraining elements, and/or the like). In this manner, if desired, manufacturers, retailers, users, or others can customize footwear or other foot-receiving devices, e.g., based on one or more characteristics of the intended user and/or one or more characteristics of the ultimate intended end use of the product. Moreover, this customization can take place at any stage in the distribution chain, for example, at the construction factory by the manufacturer, by wholesalers or retailers (e.g., at a warehouse or a point of sale location, etc.), by consumers at the time and/or after the product has been purchased, at a point of use location, etc. As one example, the characteristics of the impact attenuating device(s) and/or portions thereof may be selected at the assembly factory for a given pair of shoes, and these shoes may then be marketed specifically targeted to specific users or use characteristics (e.g., the sales box and/or a tag on the shoe might indicate that the shoe is designed for running or jogging for a user between 165 and 180 lbs.). Shoes for a series of different uses and for different user weights (or other characteristics) may then be marked on boxes or tags (depending on the characteristics of the impact attenuating element used) and placed in the market.

As another example, shoe retailers or wholesalers may have a supply of impact attenuating devices or portions thereof available to insert into the footwear or foot-receiving device at the point of sale location, e.g., based on the characteristics of the intended user and/or the intended use. As still another example, users may be allowed to freely select and/or change impact attenuating devices or portions thereof, based on their immediate needs, play conditions, and/or the characteristics they desire in the footwear or foot-receiving devices (e.g., by switching one or more devices 200 for another, by switching one or more impact attenuating elements 104 or 204 for another, by adding or changing characteristics of a ground reaction force attenuating element 210, by adding or changing characteristics of a restraining element 310, etc.). Impact attenuating devices labeled with various different characteristics (e.g., for different intended user characteristics or intended use characteristics as described above) or portions thereof may be made available to users. These aspects of the invention work particularly well for footwear and foot-receiving device designs in which one or more impact attenuating devices remain visible and/or are otherwise easily accessible by the user after the footwear, foot-receiving device, or other device is fully assembled, so that the user can remove and replace one impact attenuating device (or portion thereof) with another.

As another example, methods according to this aspect of the invention further may include providing at least an upper member and a sole member for a piece of footwear or other foot-receiving device. Based at least in part on a characteristic of an intended user of the piece of footwear or the device or a characteristic of an intended use of the piece of footwear or device, at least a portion of an impact attenuating device may be selected or identified for inclusion in the piece of footwear or in the device. As mentioned above, this selection may occur, for example, at the manufacturing location, at a wholesaler location, at a retailer location, after retail purchase, etc. The impact attenuating device or portion thereof may be included at the desired location in the piece of footwear or other foot-receiving device, e.g., between the upper member and the sole member, engaged (directly or indirectly) with at least a portion of the upper member and/or the sole member, etc. The device or portion thereof may be included in any suitable or desired form, such as in a heel cage unit, as an individual impact attenuating device, as an individual part of the impact attenuating device, etc.

If desired, a user may change the characteristics of a piece of footwear or other foot-receiving device by removing one or more the impact attenuating devices and/or portion(s) thereof and replacing it/them with new impact attenuating devices or portions thereof. This feature also can be used to replace a broken impact attenuating device, customize a shoe for a new user, customize a shoe for changing user or use conditions, etc.

D. Conclusion

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

I claim:

1. A device for attenuating impact forces for an article of footwear, comprising:
   a first element including: (a) a first base portion, (b) a second base portion, wherein a space is defined between the first base portion and the second base portion, (c) a first concave side wall portion extending between the first and second base portions and into the space, and (d) a second concave side wall portion extending between the first and second base portions and into the space; and
   a second element at least partially included in the space, wherein the second element includes a first convex side wall portion at least partially extending in the space and a second convex side wall portion at least partially extending in the space;
   wherein the first and second concave side walls and first and second convex side walls are arranged in an alternating manner such that each concave side wall is immediately adjacent two convex side walls and each convex side wall is immediately adjacent two concave side walls.

2. A device according to claim 1, further comprising:
   a restraining element at least partially surrounding the first element and the second element.

3. A device according to claim 1, further comprising:
   a ground reaction force attenuating element at least partially located in the space.

4. A device according to claim 1, further comprising:
   a first mounting base engaging at least one of the first element or the second element.

5. A device according to claim 4, further comprising:
   a second mounting base engaging at least one of the first element or the second element.

6. A device according to claim 4, wherein a first surface of the first mounting base includes at least one projection or at least one recess positioned so as to engage the first element or the second element.

7. A device for attenuating impact forces for an article of footwear, comprising:
   a first element including a plurality of concave side walls with respect to an internal space defined by the first element; and
   a second element including a plurality of convex side walls with respect to the internal space; and
   wherein the plurality of concave side walls of the first element and the plurality of convex side walls of the second element are arranged in an alternating manner such that each concave side wall of the first element is immediately adjacent two convex side walls of the second element and each convex side wall of the second element is immediately adjacent two concave side walls of the first element.

8. A device according to claim 7, further comprising:
   a restraining element at least partially surrounding the concave side walls of the first element and the convex side walls of the second element.

9. A device according to claim 7, further comprising:
   a ground reaction force attenuating element at least partially located in the internal space.

10. A device according to claim 7, further comprising:
a first mounting base engaging at least one of the first element or the second element.

11. A device according to claim 10, wherein a first surface of the first mounting base includes at least one projection or at least one recess positioned so as to engage the first element or the second element.

12. An impact attenuating device for an article of footwear, comprising:
a first base area;
a second base area;
a plurality of concave side walls extending between the first base area and the second base area; and
a plurality of convex side walls extending between the first base area and the second base area, wherein an internal space is defined between the first and second base areas and the concave and convex side walls,
wherein the plurality of concave side walls and the plurality of convex side walls are arranged in an alternating manner such that each concave side wall is immediately adjacent two convex side walls and each convex side wall is immediately adjacent two concave side walls, and
wherein, when a compressive force is applied such that the first base area and the second base area move closer to one another, the plurality of concave side walls flex in a concave direction with respect to the internal space and the plurality of convex side walls flex in a convex direction with respect to the internal space.

13. An impact attenuating device according to claim 12, further comprising:
a restraining element at least partially surrounding the plurality of convex side walls.

14. An impact attenuating device according to claim 12, further comprising:
a ground reaction force attenuating element at least partially located in the internal space.

15. An impact attenuating device according to claim 12, further comprising:
a first mounting base engaging the first base area.

16. An impact attenuating device according to claim 12, wherein the plurality of concave side walls are included as part of a first impact attenuating element and the plurality of convex side walls are included as part of a second impact attenuating element that is independent from the first impact attenuating element.

17. A foot-receiving device, comprising:
an upper member;
a sole member engaged with the upper member; and
an impact attenuating member engaged with at least one of the upper member or the sole member, wherein the impact attenuating member includes:
(a) a first element having: (i) a first base portion, (ii) a second base portion, wherein a space is defined between the first base portion and the second base portion, (iii) a first concave side wall portion extending between the first and second base portions and into the space, and (iv) a second concave side wall portion extending between the first and second base portions and into the space; and
(b) a second element at least partially included in the space, wherein the second element includes a first convex side wall portion at least partially extending in the space and a second convex side wall portion at least partially extending in the space,
wherein the first and second concave side walls of the first element and the first and second convex side walls of the second element are arranged in an alternating manner such that each concave side wall of the first element is immediately adjacent two convex side walls of the second element and each convex side wall of the second element is immediately adjacent two concave_side walls of the first element.

18. A foot-receiving device according to claim 17, wherein the impact attenuating member further includes a restraining element at least partially surrounding the first element and the second element.

19. A foot-receiving device according to claim 17, further comprising:
a ground reaction force attenuating element at least partially located in the space.

20. A foot-receiving device according to claim 17, wherein the foot-receiving device is a piece of athletic footwear.

21. A foot-receiving device, comprising:
an upper member;
a sole member engaged with the upper member; and
an impact attenuating member engaged with at least one of the upper member or the sole member, wherein the impact attenuating member includes:
(a) a first element including a plurality of concave side walls with respect to an internal space defined by the first element; and
(b) a second element including a plurality of convex side walls with respect to the internal space,
wherein the plurality of concave side walls of the first element and the plurality of convex side walls of the second element are arranged in an alternating manner such that each concave side wall of the first element is immediately adjacent two convex side walls of the second element and each convex side wall of the second element is immediately adjacent two concave side walls of the first element.

22. A foot-receiving device according to claim 21, wherein the impact attenuating member further includes a restraining element at least partially surrounding the first element and the second element.

23. A foot-receiving device according to claim 21, further comprising:
a ground reaction force attenuating element at least partially located in the internal space.

24. A foot-receiving device according to claim 21, wherein the foot-receiving device is a piece of athletic footwear.

25. A foot-receiving device, comprising:
an upper member;
a sole member engaged with the upper member; and
an impact attenuating member engaged with at least one of the upper member or the sole member, wherein the impact attenuating member includes:
(a) a first base area;
(b) a second base area;
(c) a plurality of concave side walls extending between the first base area and the second base area; and
(d) a plurality of convex side walls extending between the first base area and the second base area, wherein an internal space is defined between the first and second base areas and the concave and convex side walls, wherein the plurality of concave side walls and the plurality of convex side walls are arranged in an alternating manner such that each concave side wall is immediately adjacent two convex side walls and each convex side wall is immediately adjacent two concave side walls, and wherein, when a compressive force is applied such that the first base area and the second base area move closer to one another, the plurality of concave side walls flex in a concave direction with respect to the internal space and the plurality of convex side walls flex in a convex direction with respect to the internal space.

26. A foot-receiving device according to claim 25, wherein the impact attenuating member further includes a restraining element at least partially surrounding the plurality of convex side walls.

27. A foot-receiving device according to claim 25, further comprising:

a ground reaction force attenuating element at least partially located in the internal space.

28. A foot-receiving device according to claim 25, wherein the foot-receiving device is a piece of athletic footwear.

29. A foot-receiving device according to claim 25, wherein the plurality of concave side walls are included as part of a first impact attenuating element and the plurality of convex side walls are included as part of a second impact attenuating element that is independent from the first impact attenuating element.

* * * * *